(12) United States Patent
Wang

(10) Patent No.: US 11,774,710 B2
(45) Date of Patent: Oct. 3, 2023

(54) LENS ASSEMBLY

(71) Applicants: Sintai Optical (Shenzhen) Co., Ltd., ShenZhen (CN); Asia Optical Co., Inc., Taichung (TW)

(72) Inventor: Li-Kai Wang, Taichung (TW)

(73) Assignees: SINTAI OPTICAL (SHENZHEN) CO., LTD., Shenzhen (CN); ASIA OPTICAL CO., INC., Taichung (TW)

(*) Notice: Subject to any disclaimer, the term of this patent is extended or adjusted under 35 U.S.C. 154(b) by 343 days.

(21) Appl. No.: 17/004,213

(22) Filed: Aug. 27, 2020

(65) Prior Publication Data
US 2021/0072500 A1 Mar. 11, 2021

(30) Foreign Application Priority Data
Sep. 11, 2019 (CN) .......................... 201910856509.9

(51) Int. Cl.
  *G02B 9/60* (2006.01)
  *G02B 13/16* (2006.01)

(52) U.S. Cl.
  CPC .............. *G02B 9/60* (2013.01); *G02B 13/16* (2013.01)

(58) Field of Classification Search
  CPC ... G02B 9/60; G02B 9/62; G02B 9/64; G02B 13/0045; G02B 13/04; G02B 13/005; G02B 13/0015
  USPC ................................. 359/752–753, 761, 771
  See application file for complete search history.

(56) References Cited

U.S. PATENT DOCUMENTS

| | | | | |
|---|---|---|---|---|
| 5,493,446 A | * | 2/1996 | Nakajima | G02B 9/34 359/650 |
| 5,946,505 A | * | 8/1999 | Lee | G03B 19/12 396/152 |
| 8,908,289 B2 | | 12/2014 | Noda | |
| 9,784,946 B2 | | 10/2017 | Jo | |
| 2003/0103275 A1 | * | 6/2003 | Sato | G02B 13/04 359/708 |
| 2013/0286488 A1 | * | 10/2013 | Chae | G02B 13/18 359/714 |
| 2014/0240851 A1 | * | 8/2014 | Kawamura | G02B 9/64 359/708 |
| 2018/0067281 A1 | * | 3/2018 | Ichikawa | G02B 13/006 |
| 2018/0314054 A1 | * | 11/2018 | Takato | G02B 23/26 |
| 2019/0041610 A1 | * | 2/2019 | Wu | G02B 13/0045 |
| 2019/0219798 A1 | * | 7/2019 | Shih | G02B 9/62 |

(Continued)

FOREIGN PATENT DOCUMENTS

| | | |
|---|---|---|
| CN | 206990888 U | 2/2018 |
| CN | 109324387 A | 2/2019 |
| CN | 208654420 U | 3/2019 |

(Continued)

*Primary Examiner* — Darryl J Collins
(74) *Attorney, Agent, or Firm* — McClure, Qualey & Rodack, LLP

(57) ABSTRACT

A lens assembly includes a first lens, a second lens, a third lens, a fourth lens, and a fifth lens, all of which are arranged in order from an object side to an image side along an optical axis. The first lens has negative refractive power. The second lens has positive refractive power. The third lens has positive refractive power. The fourth lens has negative refractive power including a convex surface facing the object side and a concave surface facing the image side. The fifth lens has negative refractive power including a concave surface facing the object side.

18 Claims, 15 Drawing Sheets

(56) References Cited

U.S. PATENT DOCUMENTS

2020/0355889 A1* 11/2020 Hayashi .................. G02B 9/64

FOREIGN PATENT DOCUMENTS

| JP | 2005275280 A | 10/2005 |
|---|---|---|
| WO | 2012132456 A1 | 7/2014 |

* cited by examiner

LENS ASSEMBLY

BACKGROUND OF THE INVENTION

Field of the Invention

The invention relates to a lens assembly.

Description of the Related Art

The current development trend of a lens assembly is developed to have high resolution and lower cost. However, the known lens assembly can't satisfy such requirements. Therefore, the lens assembly needs a new structure in order to meet the requirements of high resolution and lower cost at the same time.

BRIEF SUMMARY OF THE INVENTION

The invention provides a lens assembly to solve the above problems. The lens assembly of the invention is provided with characteristics of a higher resolution, a lower cost, and still has a good optical performance.

The lens assembly in accordance with an exemplary embodiment of the invention includes a first lens, a second lens, a third lens, a fourth lens, and a fifth lens, all of which are arranged in order from an object side to an image side along an optical axis. The first lens has negative refractive power. The second lens has positive refractive power. The third lens has positive refractive power. The fourth lens has negative refractive power including a convex surface facing the object side and a concave surface facing the image side. The fifth lens has negative refractive power including a concave surface facing the object side.

In another exemplary embodiment, the first lens comprises a convex surface facing the object side and a concave surface facing the image side.

In yet another exemplary embodiment, the second lens comprises a convex surface facing the object side and a concave surface facing the image side.

In another exemplary embodiment, the third lens comprises a convex surface facing the object side and another convex surface facing the image side.

In yet another exemplary embodiment, the fifth lens further comprises a convex surface facing the image side.

In another exemplary embodiment, the lens assembly further comprising a stop disposed between the second lens and the third lens.

In yet another exemplary embodiment, the lens assembly satisfies: $3<f_2/f_3<4$; wherein $f_2$ is an effective focal length of the second lens and $f_3$ is an effective focal length of the third lens.

In another exemplary embodiment, the lens assembly satisfies: $4.8<|f_4/f_3|<5.7$; wherein $f_3$ is an effective focal length of the third lens and $f_4$ is an effective focal length of the fourth lens.

In yet another exemplary embodiment, the lens assembly satisfies: $5.2<|f_5/f_3|<6.5$; wherein $f_3$ is an effective focal length of the third lens and $f_5$ is an effective focal length of the fifth lens.

In another exemplary embodiment, the lens assembly satisfies: $-14.8<R_{52}/R_{42}<-10.7$; wherein $R_{42}$ is a radius of curvature of the image side surface of the fourth lens and $R_{32}$ is a radius of curvature of the image side surface of the fifth lens.

In yet another exemplary embodiment, the lens assembly satisfies: $-3.5<R_{31}/R_{32}<-1.9$; wherein $R_{31}$ is a radius of curvature of the object side surface of the third lens and $R_{32}$ is a radius of curvature of the image side surface of the third lens.

In another exemplary embodiment, the lens assembly satisfies: $3.7<R_{31}/R_{12}<6.1$; wherein $R_{12}$ is a radius of curvature of the image side surface of the first lens and $R_{31}$ is a radius of curvature of the object side surface of the third lens.

In yet another exemplary embodiment, the first lens and the third lens are spherical lens, and the second lens, the fourth lens and the fifth lens are made of plastic material.

The lens assembly in accordance with another exemplary embodiment of the invention includes a first lens, a second lens, a third lens, a fourth lens, and a fifth lens, all of which are arranged in order from an object side to an image side along an optical axis. The first lens has negative refractive power. The second lens has positive refractive power. The third lens has positive refractive power. The fourth lens has negative refractive power including a convex surface facing the object side and a concave surface facing the image side. The fifth lens has negative refractive power including a convex surface facing the image side.

In another exemplary embodiment, the lens assembly further comprising a stop disposed between the second lens and the third lens. The first lens comprises a convex surface facing the object side and a concave surface facing the image side. The third lens comprises a convex surface facing the object side and another convex surface facing the image side.

In yet another exemplary embodiment, the first lens and the third lens are spherical lens, and the second lens, the fourth lens and the fifth lens are made of plastic material. The lens assembly satisfies: $3<f_2/f_3<4$; wherein $f_2$ is an effective focal length of the second lens and $f_3$ is an effective focal length of the third lens.

In another exemplary embodiment, the lens assembly satisfies at least one of following conditions: $4.8<|f_4/f_3|<5.7$; $5.2<|f_5/f_3|<6.5$; wherein $f_3$ is an effective focal length of the third lens, $f_4$ is an effective focal length of the fourth lens, and $f_5$ is an effective focal length of the fifth lens.

In another exemplary embodiment, the lens assembly satisfies at least one of the following conditions: $3.7<R_{31}/R_{12}<6.1$; $-3.5<R_{31}/R_{32}<-1.9$; $-14.8<R_{52}/R_{42}<-10.7$; wherein $R_{12}$ is a radius of curvature of the image side surface of the first lens, $R_{31}$ is a radius of curvature of the object side surface of the third lens, $R_{32}$ is a radius of curvature of the image side surface of the third lens, $R_{42}$ is a radius of curvature of the image side surface of the fourth lens and $R_{52}$ is a radius of curvature of the image side surface of the fifth lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The present invention provides a lens assembly including a first lens, a second lens, a third lens, a fourth lens, and a fifth lens. The first lens is with negative refractive power. The second lens is with positive refractive power. The third lens is with positive refractive power. The fourth lens is with negative refractive power and includes a convex surface facing an object side and a concave surface facing an image side. The fifth lens is with negative refractive power and includes a concave surface facing the object side. The first lens, the second lens, the third lens, the fourth lens, and the fifth lens are arranged in order from the object side to the image side along an optical axis.

The present invention provides another lens assembly including a first lens, a second lens, a third lens, a fourth lens, and a fifth lens. The first lens is with negative refractive power. The second lens is with positive refractive power. The third lens is with positive refractive power. The fourth lens is with negative refractive power and includes a convex surface facing an object side and a concave surface facing an image side. The fifth lens is with negative refractive power and includes a convex surface facing the image side. The first lens, the second lens, the third lens, the fourth lens, and the fifth lens are arranged in order from the object side to the image side along an optical axis.

Referring to Table 1, Table 2, Table 4, Table 5, Table 7, and Table 8, wherein Table 1, Table 4, and Table 7 show optical specifications in accordance with a first, second, and third embodiments of the invention respectively and Table 2, Table 5, and Table 8 show aspheric coefficients of each aspheric surface in Table 1, Table 4, and Table 7 respectively.

Figure 1:
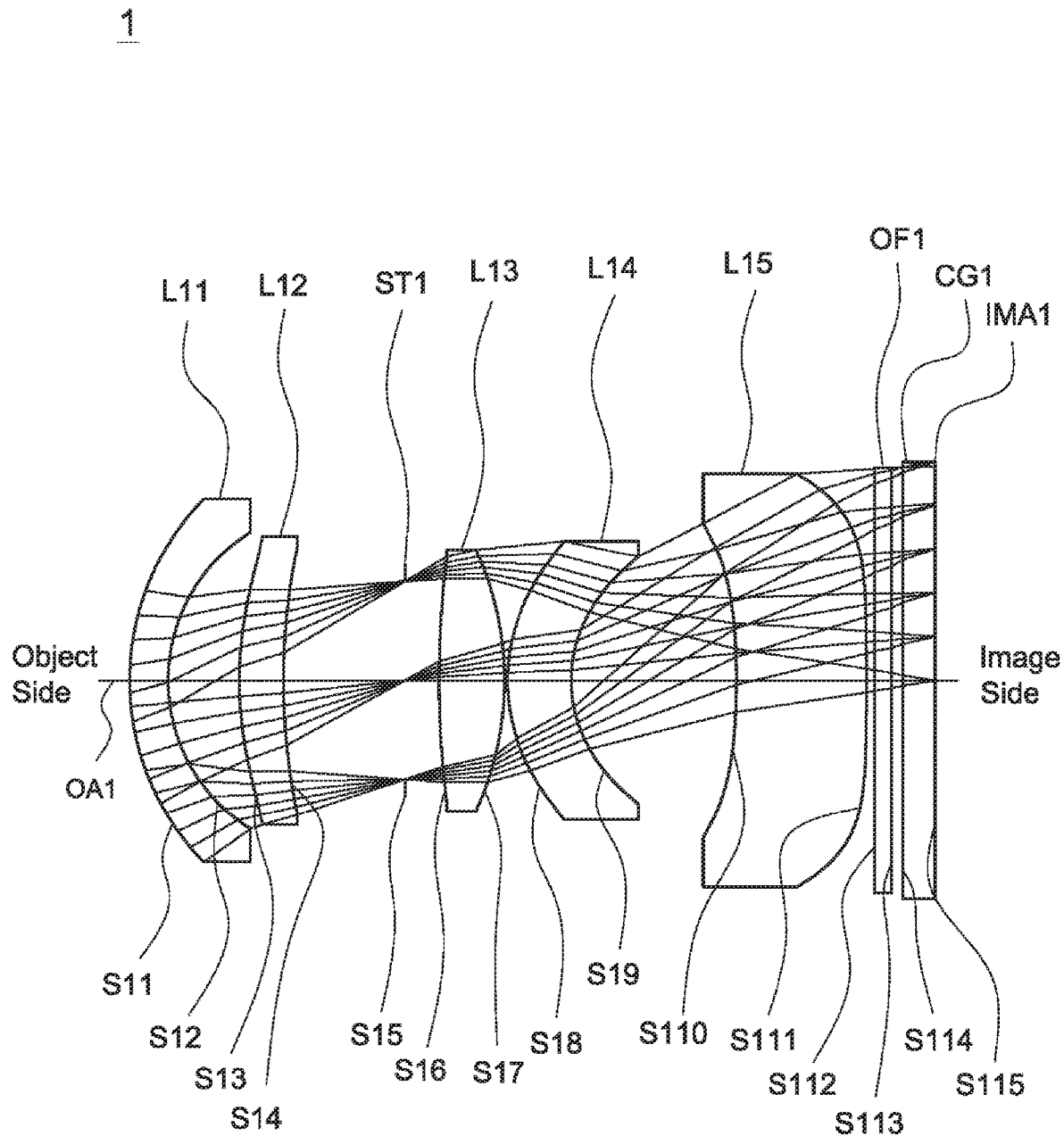
FIG. 1 is a lens layout and optical path diagram of a lens assembly in accordance with a first embodiment of the invention.
Figure 3:
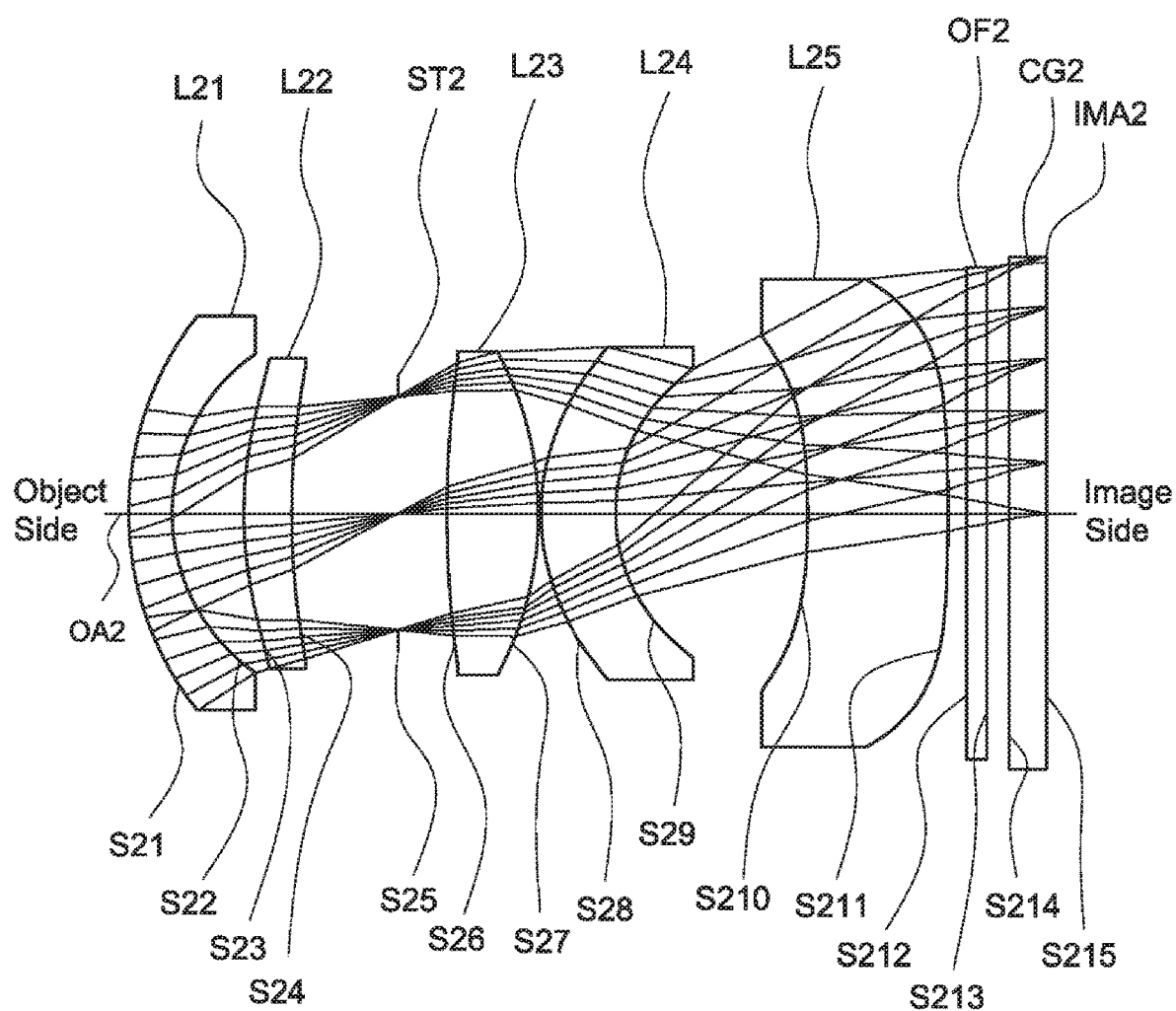
FIG. 3 is a lens layout and optical path diagram of a lens assembly in accordance with a second embodiment of the invention.
Figure 5:
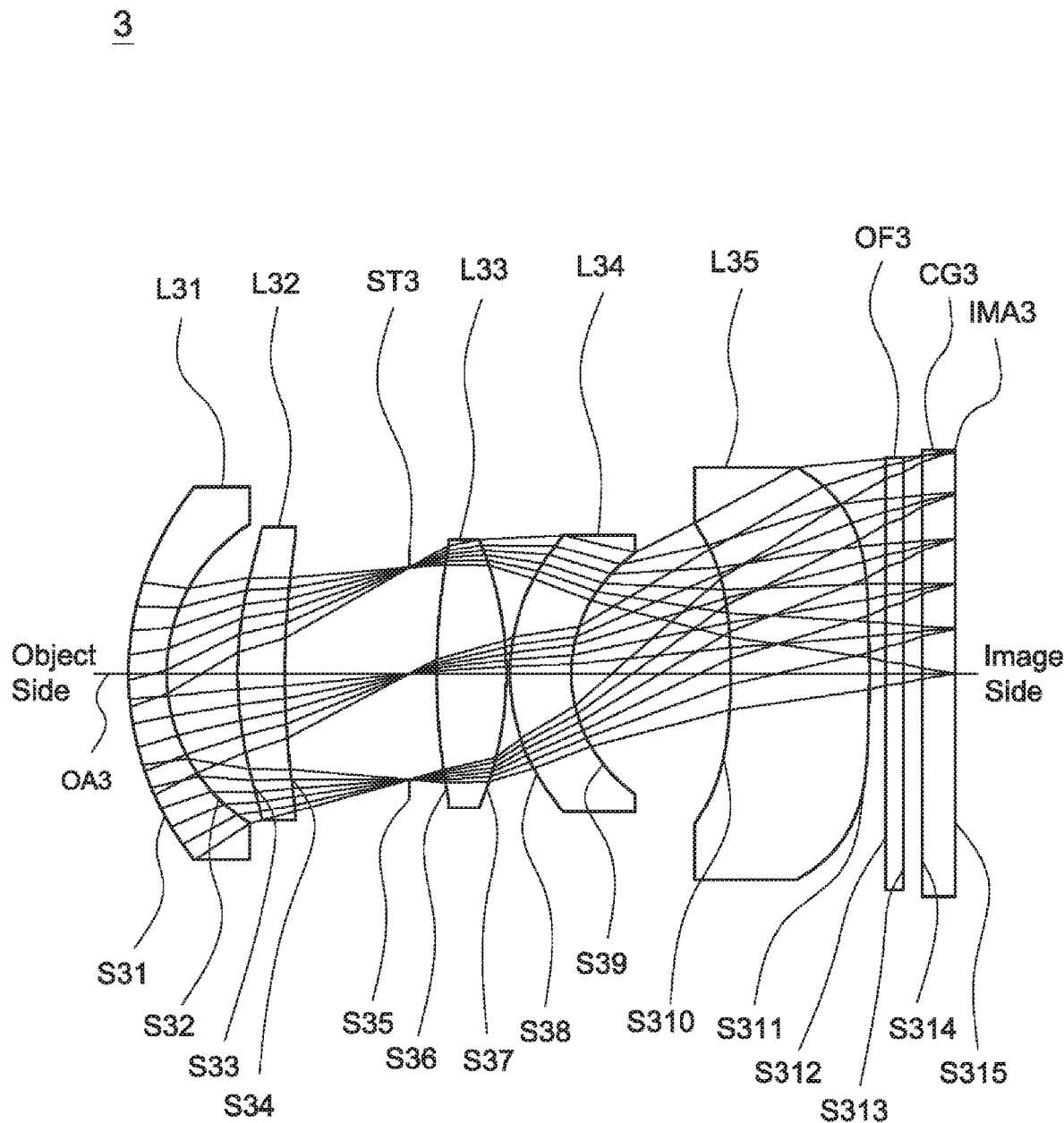
FIG. 5 is a lens layout and optical path diagram of a lens assembly in accordance with a third embodiment of the invention.

FIG. 1, FIG. 3, and FIG. 5 are lens layout and optical path diagrams of the lens assembly in accordance with the first, second, and third embodiments of the invention respectively. The first lens L11, L21, L31 are meniscus lens with negative refractive power and made of glass material, wherein the object side surfaces S11, S21, S31 are convex surfaces, the image side surfaces S12, S22, S32 are concave surfaces, and all of the object side surfaces S11, S21, S31 and the image side surfaces S12, S22, S32 are spherical surfaces.

The second lens L12, L22, L32 are meniscus lens with positive refractive power and made of plastic material, wherein the object side surfaces S13, S23, S33 are convex surfaces, the image side surfaces S14, S24, S34 are concave surfaces, wherein all of the object side surfaces S13, S23, S33 and the image side surfaces S14, S24, S34 are aspheric surfaces.

The third lens L13, L23, L33 are biconvex lens with positive refractive power and made of glass material, wherein the object side surfaces S16, S26, S36 are convex surfaces, the image side surfaces S17, S27, S37 are convex surfaces, wherein all of the object side surfaces S16, S26, S36 and the image side surfaces S17, S27, S37 are spherical surfaces.

The fourth lens L14, L24, L34 are meniscus lens with negative refractive power and made of plastic material, wherein the object side surfaces S18, S28, S38 are convex surfaces, the image side surfaces S19, S29, S39 are concave surfaces, wherein all of the object side surfaces S18, S28, S38 and the image side surfaces S19, S29, S39 are aspheric surfaces.

The fifth lens L15, L25, L35 are meniscus lens with negative refractive power and made of plastic material, wherein the object side surfaces S10, S210, S310 are concave surfaces, the image side surfaces S111, S211, S311 are convex surfaces, wherein all of the object side surfaces S110, S210, S310 and the image side surfaces S111, S211, S311 are aspheric surfaces.

In addition, the lens assembly 1, 2, 3 satisfy at least one of the following conditions:

$$3<f_2/f_3<4; \qquad (1)$$

$$4.8<|f_4/f_3|<5.7; \qquad (2)$$

$$5.2<|f_5/f_3|<6.5; \qquad (3)$$

$$3.7<R_{31}/R_{12}<6.1; \qquad (4)$$

$$-3.5<R_{31}/R_{32}<-1.9; \qquad (5)$$

$$-14.8<R_{52}/R_{42}<-10.7; \qquad (6)$$

wherein $f_2$ is an effective focal length of the second lens L12, L22, L32 for the first to third embodiments, $f_3$ is an effective focal length of the third lens L13, L23, L33 for the first to third embodiments, $f_4$ is an effective focal length of the fourth lens L14, L24, L34 for the first to third embodiments, $f_5$ is an effective focal length of the fifth lens L15, L25, L35 for the first to third embodiments, $R_{12}$ is a radius of curvature of the image side surface S12, S22, S32 of the first lens L11, L21, L31 for the first to third embodiments, $R_{31}$ is a radius of curvature of the object side surface S16, S26, S36 of the third lens L13, L23, L33 for the first to third embodiments, $R_{32}$ is a radius of curvature of the image side surface S17, S27, S37 of the third lens L13, L23, L33 for the first to third embodiments, $R_{42}$ is a radius of curvature of the image side surface S19, S29, S39 of the fourth lens L14, L24, L34 for the first to third embodiments, $R_{52}$ is a radius of curvature of the image side surface S111, S211, S311 of the fifth lens L15, L25, L35 for the first to third embodiments. Making the lens assembly 1, 2, 3 can effectively correct aberration and effectively increase resolution.

A detailed description of a lens assembly in accordance with a first embodiment of the invention is as follows. Referring to FIG. 1, the lens assembly 1 includes a first lens L11, a second lens L12, a stop ST1, a third lens L13, a fourth lens L14, a fifth lens L15, an optical filter OF1, and cover glass CG1, all of which are arranged in order from an object side to an image side along an optical axis OA1. In operation, an image of light rays from the object side is formed at an image plane IMA1.

According to the foregoing description, wherein: both of the object side surface S112 and image side surface S113 of the optical filter OF are plane surfaces; and both of the object side surface S114 and image side surface S115 of the cover glass CG1 are plane surfaces.

With the above design of the lenses and stop ST1 and at least any one of the conditions (1)-(6) satisfied, the lens assembly 1 can effectively correct aberration and effectively increase resolution.

If the value of the condition (5) $R_{31}/R_{32}$ is greater than −1.9, the correction aberration capability of the third lens L13 is reduced, and the shape of the third lens L13 cannot be effectively controlled. Therefore, the value of $R_{31}/R_{32}$ must be at least less than −1.9, so the optimal range of effect is −3.5<$R_{31}/R_{32}$<−1.9, within this range, the shape of the third lens L13 can be effectively controlled, constrain the refractive strength of the third lens L13, and enhance the aberration correction ability of the third lens L13.

Table 1 shows the optical specification of the lens assembly 1 in FIG. 1.

TABLE 1

| | Effective Focal Length = 4.964 mm F-number = 2.2 | | | | | |
| | Total Lens Length = 10.029 mm Field of View = 60.502 Degrees | | | | | |
| Surface Number | Radius of Curvature (mm) | Thickness (mm) | Nd | Vd | Effective Focal Length (mm) | Remark |
| --- | --- | --- | --- | --- | --- | --- |
| S11 | 3.301 | 0.427 | 1.729 | 54.680 | −11.292 | The First Lens L11 |
| S12 | 2.203 | 0.900 | | | | |
| S13 | 4.763 | 0.565 | 1.661 | 20.373 | 16.653 | The Second Lens L12 |
| S14 | 8.292 | 1.506 | | | | |
| S15 | ∞ | 0.431 | | | | Stop ST1 |
| S16 | 12.515 | 0.818 | 1.729 | 54.680 | 4.245 | The Third Lens L13 |
| S17 | −3.901 | 0.035 | | | | |
| S18 | 2.277 | 0.800 | 1.661 | 20.372 | −23.389 | The Fourth Lens L14 |
| S19 | 1.705 | 2.063 | | | | |
| S110 | −8.857 | 1.632 | 1.535 | 56.115 | −27.04 | The Fifth Lens L15 |
| S111 | −25.000 | 0.1 | | | | |
| S112 | ∞ | 0.21 | 1.517 | 64.167 | | Optical Filter OF1 |
| S113 | ∞ | 0.142 | | | | |
| S114 | ∞ | 0.4 | 1.517 | 64.167 | | Cover Glass CG1 |

The aspheric surface sag z of each aspheric surface in table 1 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D, and E are aspheric coefficients.

In the first embodiment, the conic constant k and the aspheric coefficients A, B, C, D, E of each aspheric surface are shown in Table 2.

TABLE 2

| Surface Number | k | A | B | C | D | E |
|---|---|---|---|---|---|---|
| S13 | 3.494 | −7.035E−3 | −4.895E−4 | −3.954E−4 | 0 | 0 |
| S14 | 17.319 | −3.814E−3 | −6.135E−4 | −2.720E−4 | 0 | 0 |
| S18 | 0.323 | −0.01034 | 4.7153E−3 | −6.138E−3 | 2.2268E−3 | −3.813E−4 |
| S19 | −0.498 | 6.8443E−3 | 5.5087E−3 | −6.498E−3 | 3.5907E−3 | −7.947E−4 |
| S110 | 0 | −7.168E−3 | −5.262E−3 | 2.383E−3 | −6.473E−4 | 7.4037E−5 |
| S111 | 0 | 6.845E−3 | −5.38E−3 | 2.1281E−4 | 4.4744E−5 | −4.968E−6 |

Table 3 shows the parameters and condition values for conditions (1)-(6) in accordance with the first embodiment of the invention. It can be seen from Table 3 that the lens assembly 1 of the first embodiment satisfies the conditions (1)-(6).

TABLE 3

| $f_2/f_3$ | 3.92 | $|f_4/f_3|$ | 5.51 | $|f_5/f_3|$ | 6.37 |
|---|---|---|---|---|---|
| $R_{31}/R_{12}$ | 5.68 | $R_{31}/R_{32}$ | −3.21 | $R_{52}/R_{42}$ | −14.66 |

Figure 2A:
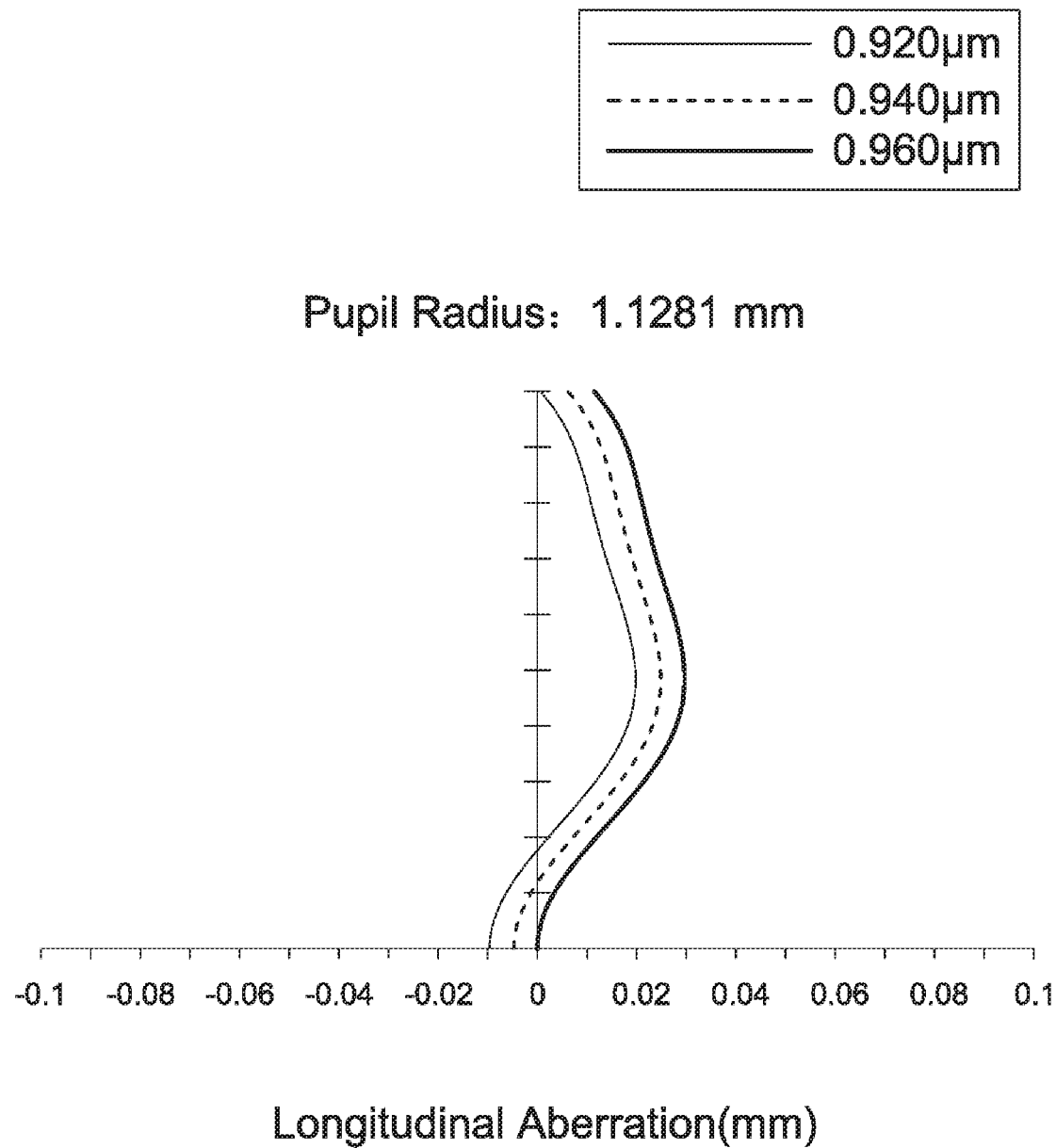
FIG. 2A depicts a longitudinal aberration diagram of the lens assembly in accordance with the first embodiment of the invention.
Figure 2B:
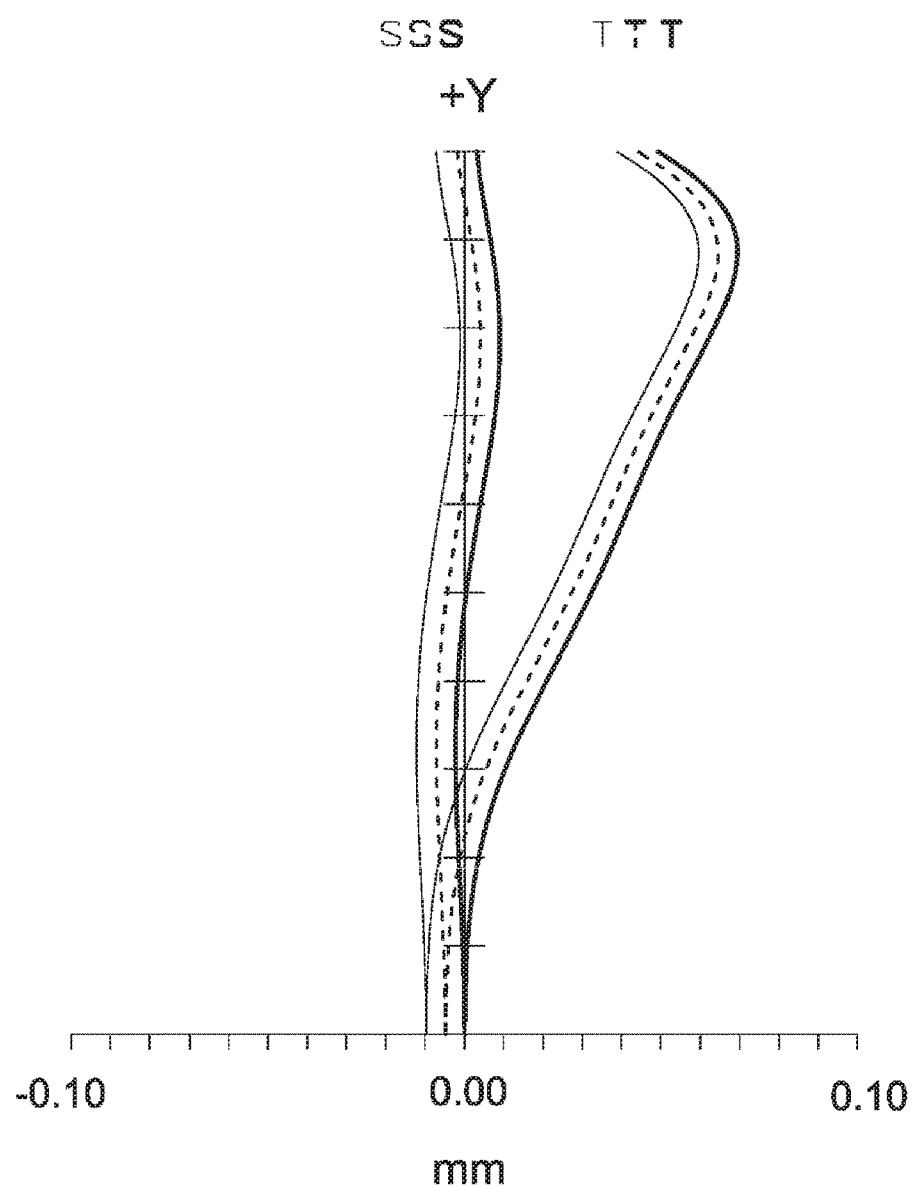
FIG. 2B is a field curvature diagram of the lens assembly in accordance with the first embodiment of the invention.
Figure 2C:
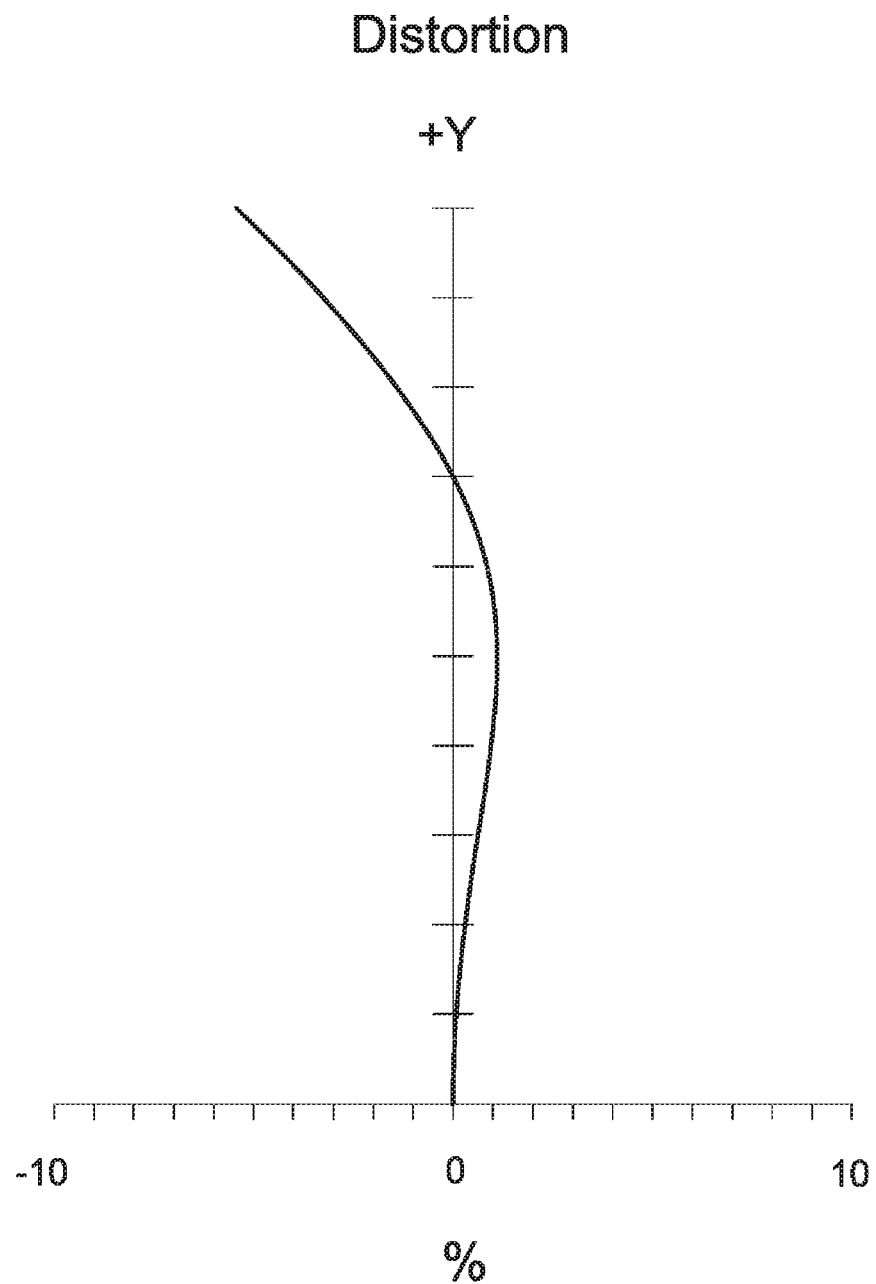
FIG. 2C is a distortion diagram of the lens assembly in accordance with the first embodiment of the invention.
Figure 2D:
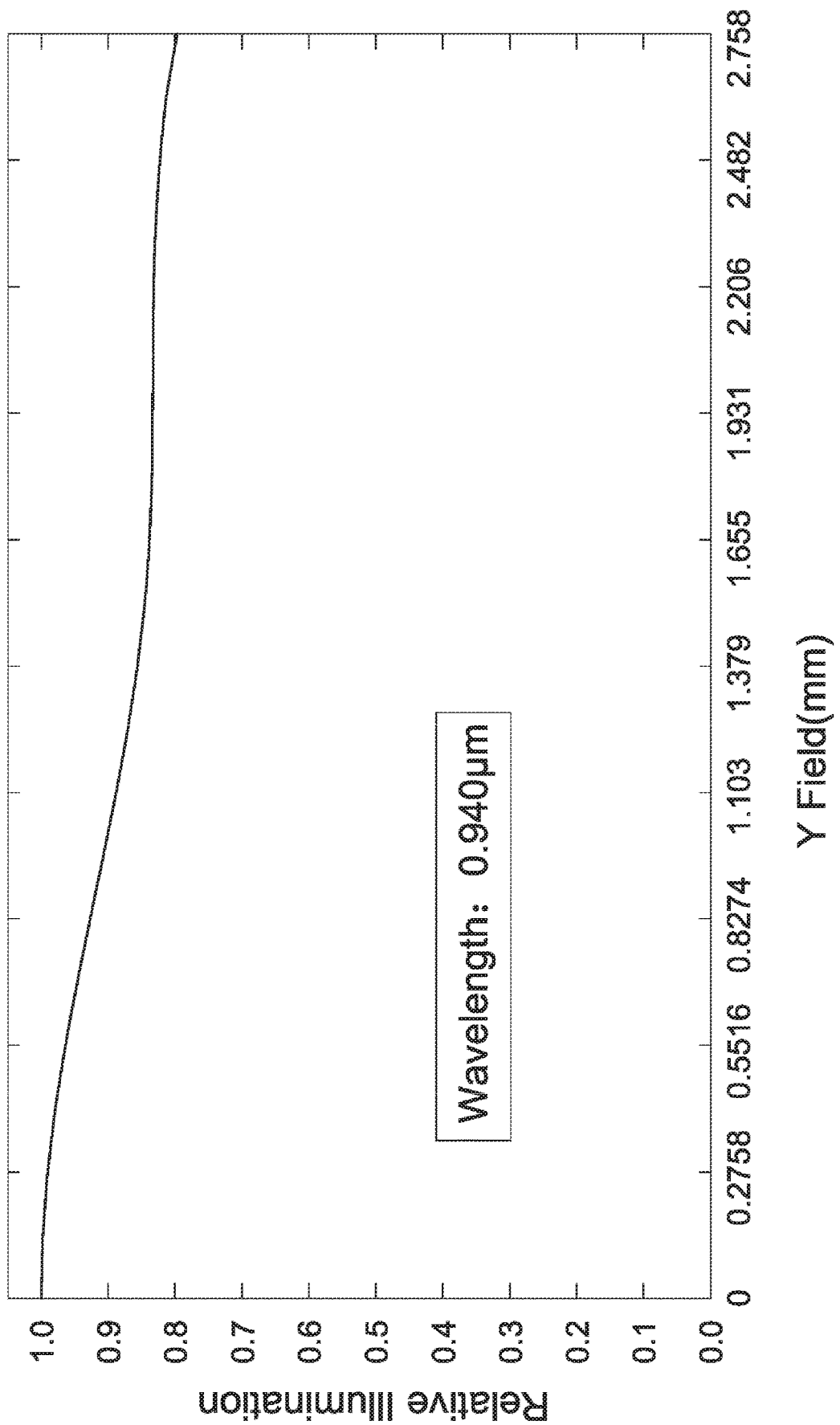
FIG. 2D is a relative illumination diagram of the lens assembly in accordance with the first embodiment of the invention.

By the above arrangements of the lenses and stop ST1, the lens assembly 1 of the first embodiment can meet the requirements of optical performance as seen in FIGS. 2A-2D, wherein FIG. 2A shows a longitudinal aberration diagram of the lens assembly 1 in accordance with the first embodiment of the invention, FIG. 2B shows a field curvature diagram of the lens assembly 1 in accordance with the first embodiment of the invention, FIG. 2C shows a distortion diagram of the lens assembly 1 in accordance with the first embodiment of the invention, and FIG. 2D shows a relative illumination diagram of the lens assembly 1 in accordance with the first embodiment of the invention. It can be seen from FIG. 2A that the longitudinal aberration in the lens assembly 1 of the first embodiment ranges from −0.01 mm to 0.03 mm. It can be seen from FIG. 2B that the field curvature of tangential direction and sagittal direction in the lens assembly 1 of the first embodiment ranges from −0.02 mm to 0.07 mm. It can be seen from FIG. 2C that the distortion in the lens assembly 1 of the first embodiment ranges from −6% to 2%. It can be seen from FIG. 2D that the relative illumination in the lens assembly 1 of the first embodiment ranges from 0.8 to 1.0.

It is obvious that the longitudinal aberration, the field curvature and the distortion of the lens assembly 1 of the first embodiment can be corrected effectively, and the relative illumination of the lens assembly 1 of the first embodiment can meet the requirement. Therefore, the lens assembly 1 of the first embodiment is capable of good optical performance.

Referring to FIG. 3, FIG. 3 is a lens layout and optical path diagram of a lens assembly in accordance with a second embodiment of the invention. The lens assembly 2 includes a first lens L21, a second lens L22, a stop ST2, a third lens L23, a fourth lens L24, a fifth lens L25, an optical filter OF2, and cover glass CG2, all of which are arranged in order from an object side to an image side along an optical axis OA2. In operation, an image of light rays from the object side is formed at an image plane IMA2.

According to the foregoing description, wherein: both of the object side surface S212 and image side surface S213 of the optical filter OF2 are plane surfaces; and both of the object side surface S214 and image side surface S215 of the cover glass CG2 are plane surfaces.

With the above design of the lenses and stop ST2 and at least any one of the conditions (1)-(6) satisfied, the lens assembly 2 can effectively correct aberration and effectively increase resolution.

If the value of the condition (1) $f_2/f_3$ is greater than 4, it makes the correction aberration capability of the lens assembly poor. Therefore, the value of $f_2/f_3$ must be at least less than 4, so the optimal range of effect is $3 < f_2/f_3 < 4$, and meeting this range has the best corrected aberration condition and helps to reduce sensitivity.

Table 4 shows the optical specification of the lens assembly 2 in FIG. 3.

TABLE 4

Effective Focal Length = 4.928 mm F-number = 2.2
Total Lens Length = 9.802 mm Field of View = 60.538 Degrees

| Surface Number | Radius of Curvature (mm) | Thickness (mm) | Nd | Vd | Effective Focal Length (mm) | Remark |
|---|---|---|---|---|---|---|
| S21 | 3.436 | 0.464 | 1.729 | 54.680 | −8.838 | The First Lens L21 |
| S22 | 2.101 | 0.764 | | | | |
| S23 | 4.461 | 0.517 | 1.661 | 20.373 | 13.778 | The Second Lens L22 |
| S24 | 8.727 | 1.134 | | | | |
| S25 | ∞ | 0.529 | | | | Stop ST2 |
| S26 | 12.487 | 0.971 | 1.729 | 54.680 | 4.046 | The Third Lens L23 |
| S27 | −3.647 | 0.025 | | | | |

TABLE 4-continued

Effective Focal Length = 4.928 mm F-number = 2.2
Total Lens Length = 9.802 mm Field of View = 60.538 Degrees

| Surface Number | Radius of Curvature (mm) | Thickness (mm) | Nd | Vd | Effective Focal Length (mm) | Remark |
|---|---|---|---|---|---|---|
| S28 | 2.443 | 0.799 | 1.661 | 20.372 | −22.653 | The Fourth Lens L24 |
| S29 | 1.822 | 2.052 | | | | |
| S210 | −7.256 | 1.5 | 1.535 | 56.115 | −22.584 | The Fifth Lens L25 |
| S211 | −20 | 0.2 | | | | |
| S212 | ∞ | 0.21 | 1.517 | 64.167 | | Optical Filter OF2 |
| S213 | ∞ | 0.237 | | | | |
| S214 | ∞ | 0.4 | 1.517 | 64.167 | | Cover Glass CG2 |
| S215 | ∞ | 0 | | | | |

The definition of aspheric surface sag z of each aspheric surface in table 4 is the same as that of in Table 1, and is not described here again.

In the second embodiment, the conic constant k and the aspheric coefficients A, B, C, D, E of each aspheric surface are shown in Table 5.

TABLE 5

| Surface Number | k | A | B | C | D | E |
|---|---|---|---|---|---|---|
| S23 | −8.551 | 9.4756E−3 | −1.299E−3 | −4.74E−4 | 0 | 0 |
| S24 | 21.26 | −1.928E−3 | −1.698E−4 | −6.55E−4 | 0 | 0 |
| S28 | 0.498 | −9.622E−3 | 6.5697E−3 | −6.641E−3 | 2.3831E−3 | −3.835E−4 |
| S29 | −0.767 | 0.012819 | 0.011993 | −0.010289 | 5.8326E−3 | −1.204E−3 |
| S210 | 0 | −0.010666 | −7.382E−3 | 3.6848E−3 | −1.143E−3 | 1.4814E−4 |
| S211 | 0 | 5.5972E−4 | −5.015E−3 | 4.8846E−4 | −9.062E−6 | −2.562E−6 |

Table 6 shows the parameters and condition values for conditions (1)-(6) in accordance with the second embodiment of the invention. It can be seen from Table 6 that the lens assembly 2 of the second embodiment satisfies the conditions (1)-(6).

TABLE 6

| $f_2/f_3$ | 3.41 | $|f_4/f_3|$ | 5.60 | $|f_5/f_3|$ | 5.58 |
|---|---|---|---|---|---|
| $R_{31}/R_{12}$ | 5.94 | $R_{31}/R_{32}$ | −3.42 | $R_{52}/R_{42}$ | −10.98 |

Figure 4A:
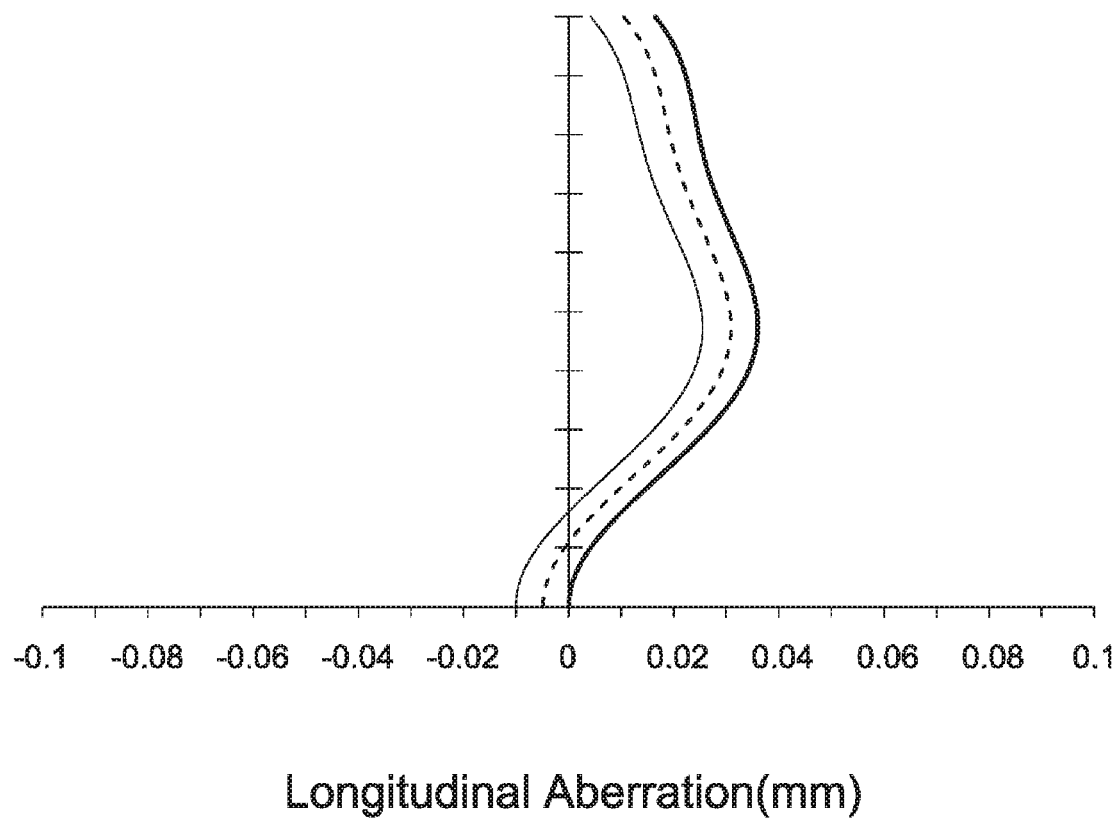
FIG. 4A depicts a longitudinal aberration diagram of the lens assembly in accordance with the second embodiment of the invention.
Figure 4B:
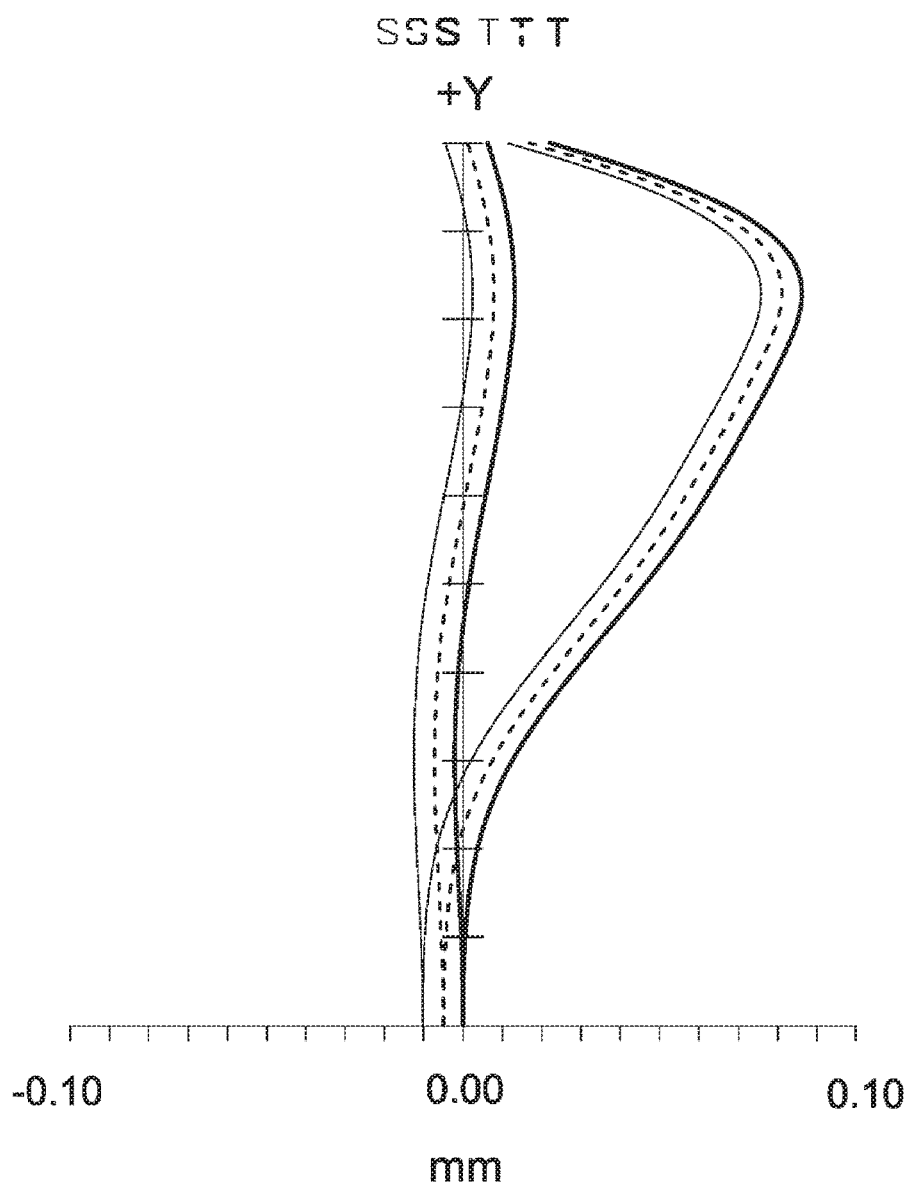
FIG. 4B is a field curvature diagram of the lens assembly in accordance with the second embodiment of the invention.
Figure 4C:
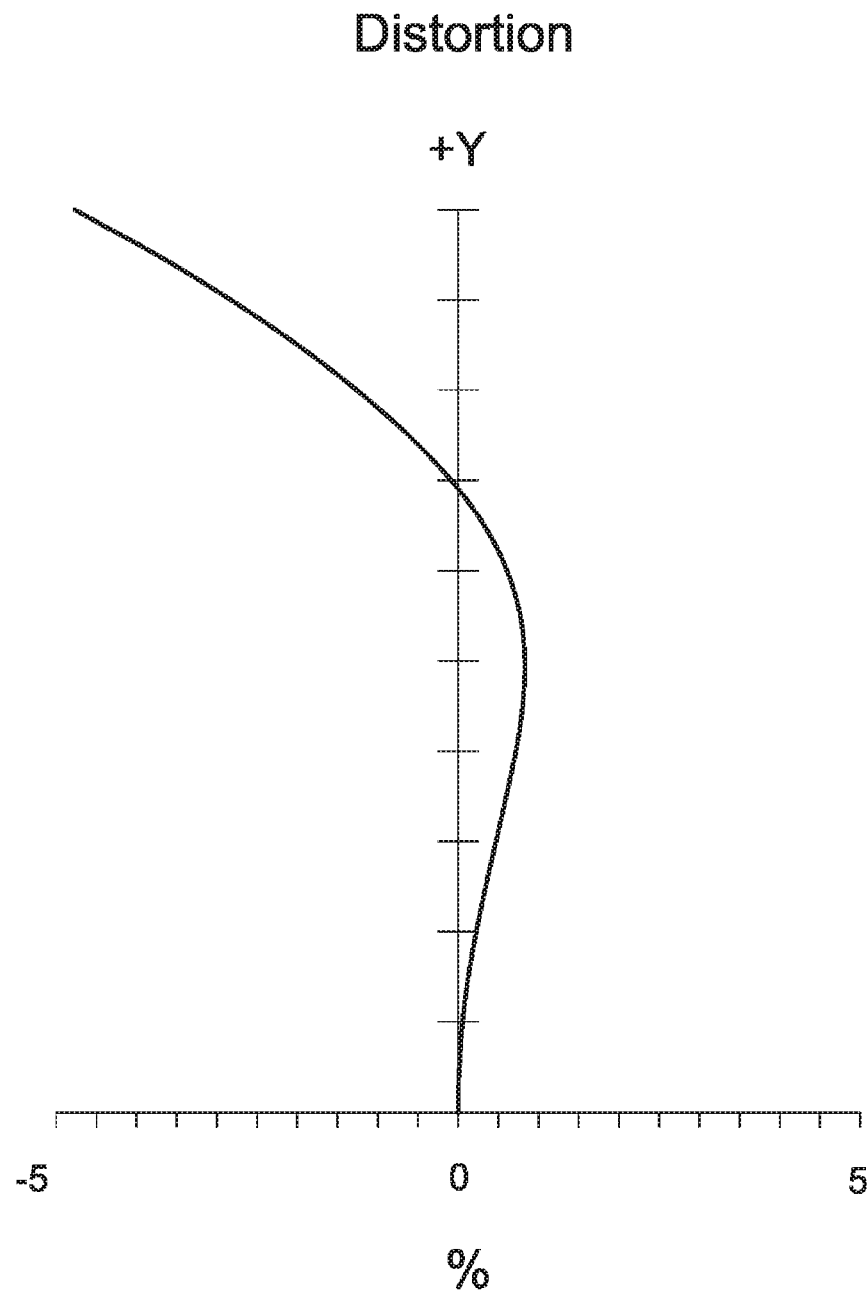
FIG. 4C is a distortion diagram of the lens assembly in accordance with the second embodiment of the invention.
Figure 4D:
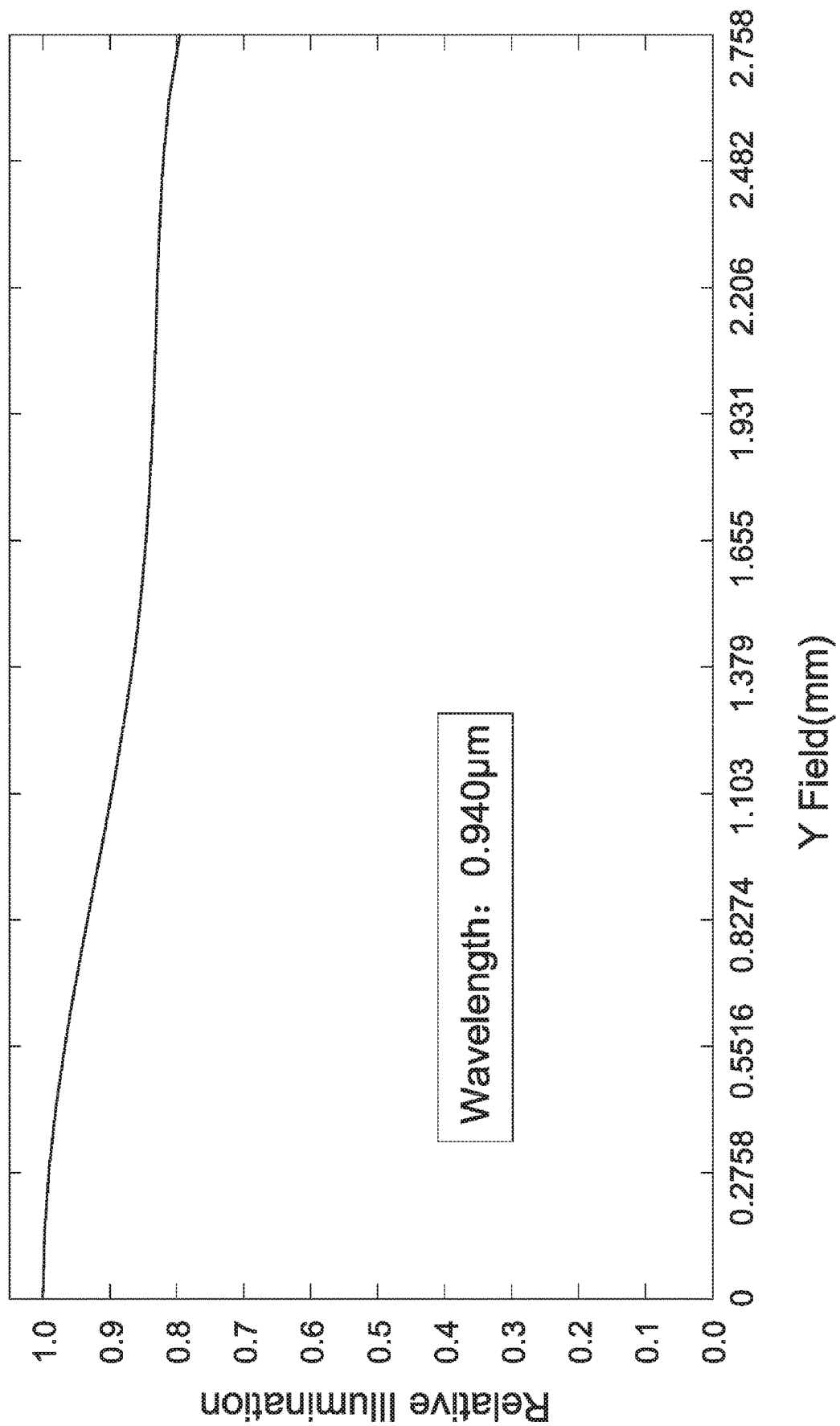
FIG. 4D is a relative illumination diagram of the lens assembly in accordance with the second embodiment of the invention.

By the above arrangements of the lenses and stop ST2, the lens assembly 2 of the second embodiment can meet the requirements of optical performance as seen in FIGS. 4A-4D, wherein FIG. 4A shows a longitudinal aberration diagram of the lens assembly 2 in accordance with the second embodiment of the invention, FIG. 4B shows a field curvature diagram of the lens assembly 2 in accordance with the second embodiment of the invention, FIG. 4C shows a distortion diagram of the lens assembly 2 in accordance with the second embodiment of the invention, and FIG. 4D shows a relative illumination diagram of the lens assembly 2 in accordance with the second embodiment of the invention. It can be seen from FIG. 4A that the longitudinal aberration in the lens assembly 2 of the second embodiment ranges from −0.01 mm to 0.04 mm. It can be seen from FIG. 4B that the field curvature of tangential direction and sagittal direction in the lens assembly 2 of the second embodiment ranges from −0.02 mm to 0.09 mm. It can be seen from FIG. 4C that the distortion in the lens assembly 2 of the second embodiment ranges from −5% to 1%. It can be seen from FIG. 4D that the relative illumination in the lens assembly 2 of the second embodiment ranges from 0.8 to 1.0.

It is obvious that the longitudinal aberration, the field curvature and the distortion of the lens assembly 2 of the second embodiment can be corrected effectively, and the relative illumination of the lens assembly 2 of the second embodiment can meet the requirement. Therefore, the lens assembly 2 of the second embodiment is capable of good optical performance.

Referring to FIG. 5, FIG. 5 is a lens layout and optical path diagram of a lens assembly in accordance with a third embodiment of the invention. The lens assembly 3 includes a first lens L31, a second lens L32, a stop ST3, a third lens L33, a fourth lens L34, a fifth lens L35, an optical filter OF3, and cover glass CG3, all of which are arranged in order from an object side to an image side along an optical axis OA3. In operation, an image of light rays from the object side is formed at an image plane IMA3.

According to the foregoing description, wherein: both of the object side surface S312 and image side surface S313 of the optical filter OF3 are plane surfaces; and both of the object side surface S314 and image side surface S315 of the cover glass CG3 are plane surfaces.

With the above design of the lenses and stop ST3 and at least any one of the conditions (1)-(6) satisfied, the lens assembly 3 can effectively correct aberration and effectively increase resolution.

If the value of the condition (2) $|f_4/f_3|$ is less than 4.8, it makes the correction aberration capability of the lens assembly poor. Therefore, the value of $|f_4/f_3|$ must be at least greater than 4.8, so the optimal range of effect is $4.8<|f_4/f_3|<5.7$, and meeting this range has the best corrected aberration condition and helps to reduce sensitivity.

Table 7 shows the optical specification of the lens assembly 3 in FIG. 5.

TABLE 7

Effective Focal Length = 4.936 mm F-number = 2.2
Total Lens Length = 10.125 mm Field of View = 60.542 Degrees

| Surface Number | Radius of Curvature (mm) | Thickness (mm) | Nd | Vd | Effective Focal Length (mm) | Remark |
|---|---|---|---|---|---|---|
| S31 | 3.669 | 0.468 | 1.729 | 54.680 | −8.621 | The First Lens L31 |
| S32 | 2.178 | 0.867 | | | | |
| S33 | 4.804 | 0.584 | 1.661 | 20.373 | 12.821 | The Second Lens L32 |
| S34 | 11.226 | 1.525 | | | | |
| S35 | ∞ | 0.331 | | | | Stop ST3 |
| S36 | 8.392 | 0.849 | 1.729 | 54.680 | 4.044 | The Third Lens L33 |
| S37 | −4.231 | 0.046 | | | | |
| S38 | 2.404 | 0.757 | 1.661 | 20.372 | −19.695 | The Fourth Lens L34 |
| S39 | 1.77 | 1.95 | | | | |
| S310 | −7.587 | 1.701 | 1.535 | 56.115 | −21.448 | The Fifth Lens L35 |
| S311 | −25 | 0.2 | | | | |
| S312 | ∞ | 0.21 | 1.517 | 64.167 | | Optical Filter OF3 |
| S313 | ∞ | 0.237 | | | | |
| S314 | ∞ | 0.4 | 1.517 | 64.167 | | Cover Glass CG3 |
| S315 | ∞ | 0 | | | | |

The definition of aspheric surface sag z of each aspheric surface in table 7 is the same as that of in Table 1, and is not described here again.

In the third embodiment, the conic constant k and the aspheric coefficients A, B, C, D, E of each aspheric surface are shown in Table 8.

TABLE 8

| Surface Number | k | A | B | C | D | E |
|---|---|---|---|---|---|---|
| S33 | −0.306 | −1.315E−3 | 9.776E−4 | −5.59E−4 | 0 | 0 |
| S34 | 32.198 | −1.431103 | 5.6554E−4 | −6.524E−4 | 0 | 0 |
| S38 | 0.597 | −0.010428 | 8.7415E−3 | −9.823E−3 | 3.8306E−3 | −6.524E−4 |
| S39 | −0.579 | 0.01191 | 0.014702 | −0.015085 | 8.873E−3 | −1.918E−3 |
| S310 | 0 | −0.011332 | −7.542E−3 | 4.262E−3 | −1.451E−3 | 1.9905E−4 |
| S311 | 0 | −1.54E−3 | −4.374E−3 | 3.9897E−4 | −4.561E−6 | −2.383E−6 |

Table 9 shows the parameters and condition values for conditions (1)-(6) in accordance with the third embodiment of the invention. It can be seen from Table 9 that the lens assembly 3 of the third embodiment satisfies the conditions (1)-(6).

TABLE 9

| $f_2/f_3$ | 3.17 | $|f_4/f_3|$ | 4.87 | $|f_5/f_3|$ | 5.30 |
|---|---|---|---|---|---|
| $R_{31}/R_{12}$ | 3.85 | $R_{31}/R_{32}$ | −1.98 | $R_{52}/R_{42}$ | −14.12 |

Figure 6A:
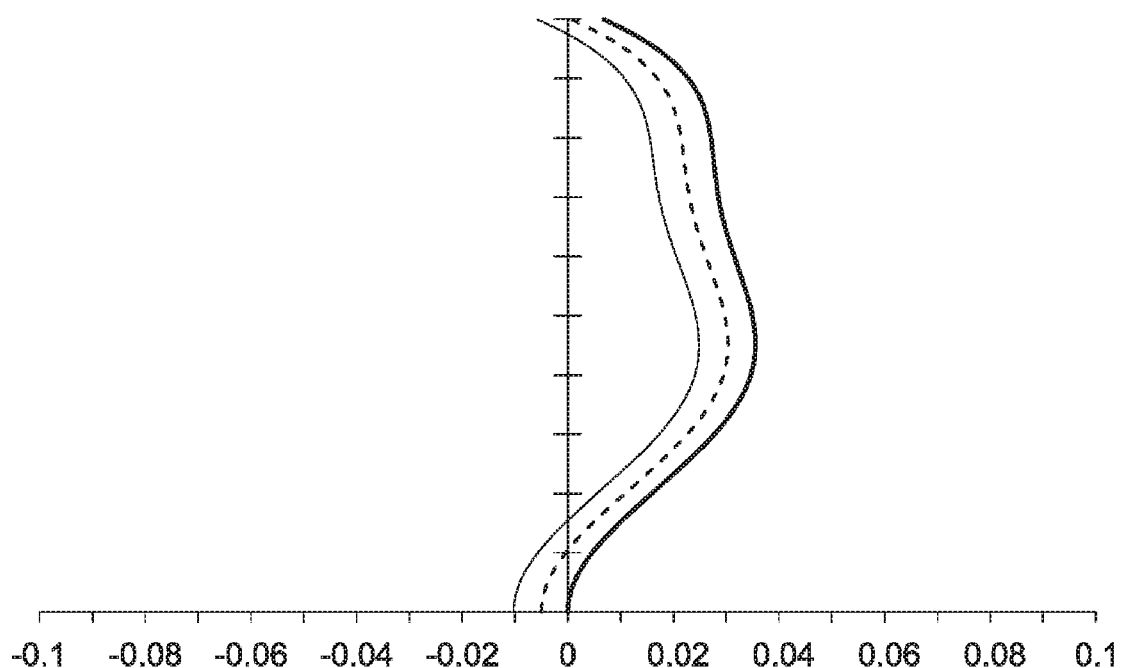
FIG. 6A depicts a longitudinal aberration diagram of the lens assembly in accordance with the third embodiment of the invention.
Figure 6B:
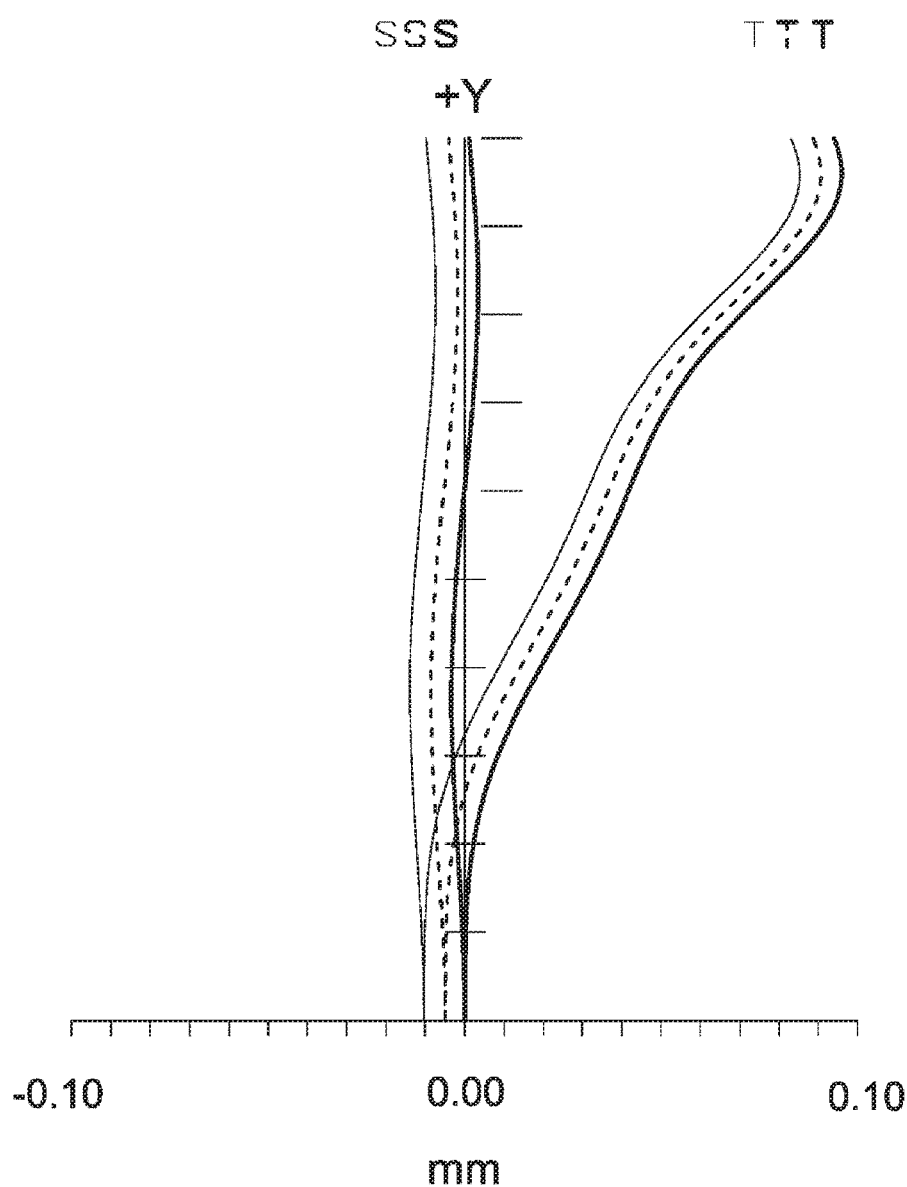
FIG. 6B is a field curvature diagram of the lens assembly in accordance with the third embodiment of the invention.
Figure 6C:
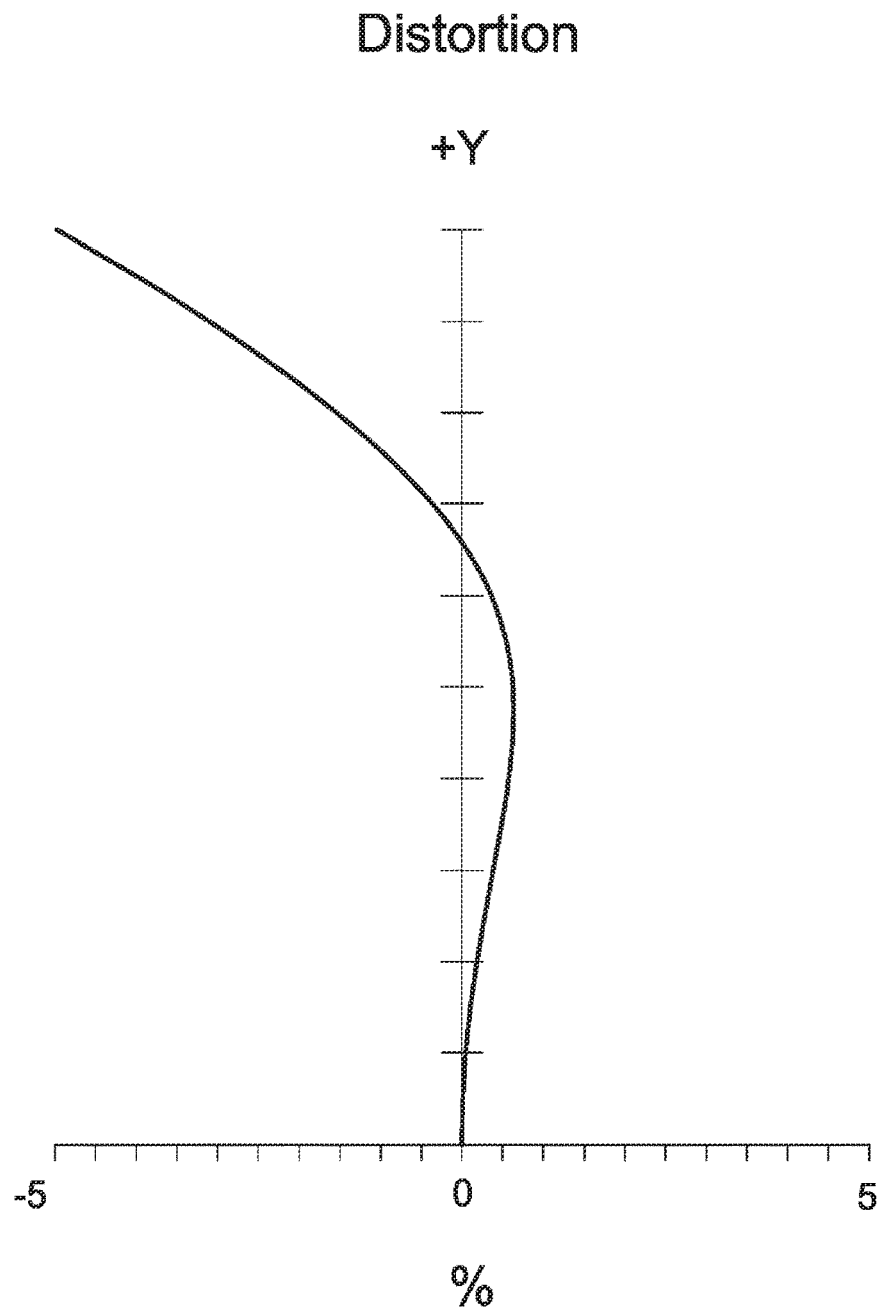
FIG. 6C is a distortion diagram of the lens assembly in accordance with the third embodiment of the invention.
Figure 6D:
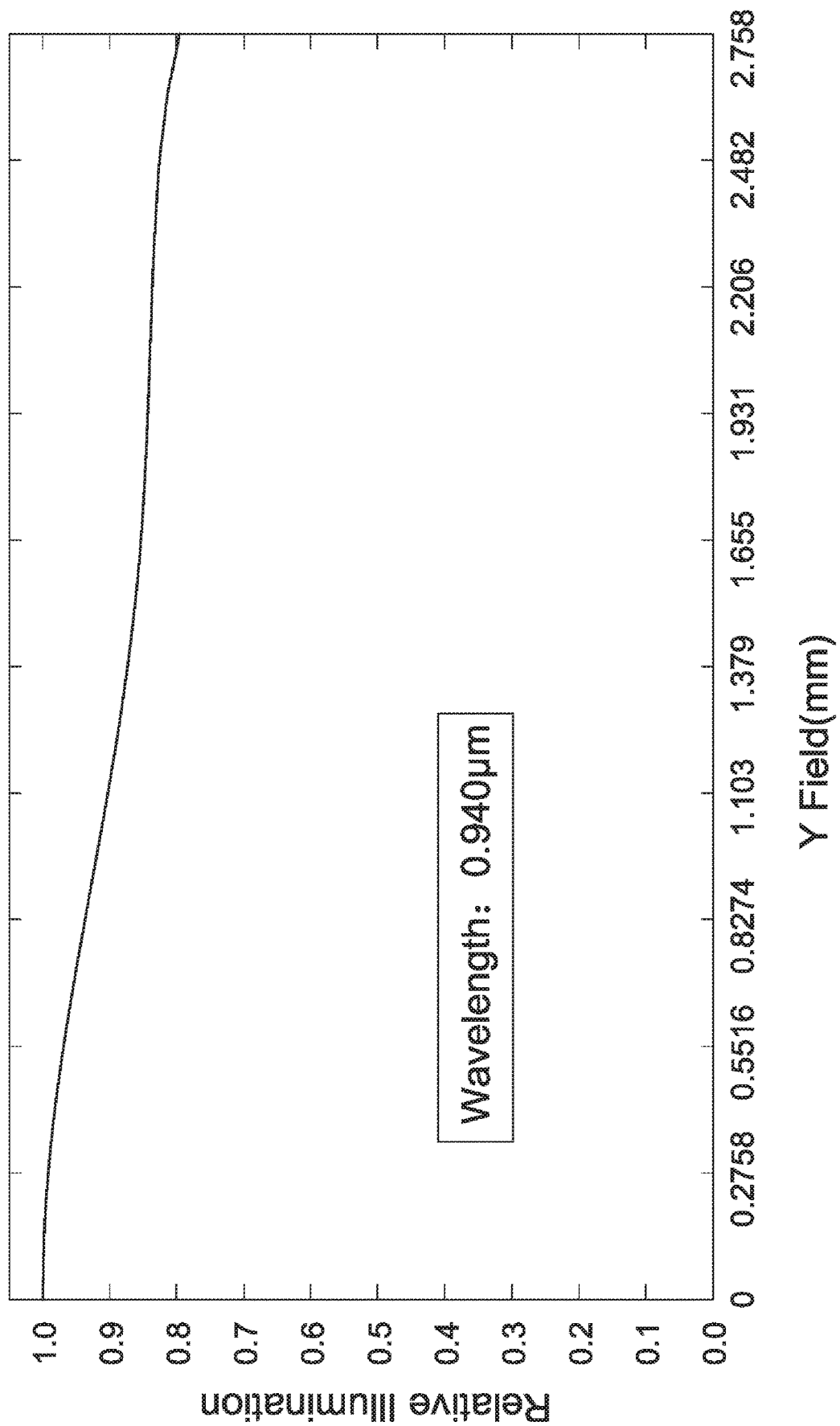
FIG. 6D is a relative illumination diagram of the lens assembly in accordance with the third embodiment of the invention.

By the above arrangements of the lenses and stop ST3, the lens assembly 3 of the third embodiment can meet the requirements of optical performance as seen in FIGS. 6A-6D, wherein FIG. 6A shows a longitudinal aberration diagram of the lens assembly 3 in accordance with the third embodiment of the invention, FIG. 6B shows a field curvature diagram of the lens assembly 3 in accordance with the third embodiment of the invention, FIG. 6C shows a distortion diagram of the lens assembly 3 in accordance with the third embodiment of the invention, and FIG. 6D shows a relative illumination diagram of the lens assembly 3 in accordance with the third embodiment of the invention. It can be seen from FIG. 6A that the longitudinal aberration in the lens assembly 3 of the third embodiment ranges from −0.01 mm to 0.04 mm. It can be seen from FIG. 6B that the field curvature of tangential direction and sagittal direction in the lens assembly 3 of the third embodiment ranges from −0.02 mm to 0.10 mm. It can be seen from FIG. 6C that the distortion in the lens assembly 3 of the third embodiment ranges from −5% to 1%. It can be seen from FIG. 6D that the relative illumination in the lens assembly 3 of the third embodiment ranges from 0.8 to 1.0.

It is obvious that the longitudinal aberration, the field curvature and the distortion of the lens assembly 3 of the third embodiment can be corrected effectively, and the relative illumination of the lens assembly 3 of the third embodiment can meet the requirement. Therefore, the lens assembly 3 of the third embodiment is capable of good optical performance.

The conditions of the present invention are centered around $-3.5<R_{31}/R_{32}<-1.9$, $3<f_2/f_3<4$, $4.8<|f_4/f_3|<5.7$, and the values of the embodiments of the present invention also fall within the scope of the remaining conditions. Condition $-3.5<R_{31}/R_{32}<-1.9$, which helps to enhance aberration correction capability of the third lens. Condition $3<f_2/f_3<4$, with the best corrected aberration conditions. Condition $4.8<|f_4/f_3|<5.7$, which can help reduce sensitivity.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly, comprising sequentially from an object side to an image side along an optical axis:
    a first lens with negative refractive power including a convex surface facing the object side and a concave surface facing the image side;
    a second lens with positive refractive power;
    a third lens with positive refractive power;
    a fourth lens with negative refractive power including a convex surface facing the object side and a concave surface facing the image side; and
    a fifth lens with negative refractive power including a concave surface facing the object side;
    wherein the lens assembly satisfies:

$-14.8<R_{52}/R_{42}<-10.7$;

wherein $R_{42}$ is a radius of curvature of the image side surface of the fourth lens and $R_{52}$ is a radius of curvature of the image side surface of the fifth lens.

2. The lens assembly as claimed in claim 1, wherein the third lens comprises a convex surface facing the object side and another convex surface facing the image side.

3. The lens assembly as claimed in claim 1, wherein the second lens comprises a convex surface facing the object side and a concave surface facing the image side.

4. The lens assembly as claimed in claim 3, wherein the fifth lens further comprises a convex surface facing the image side.

5. The lens assembly as claimed in claim 4, wherein further comprising a stop disposed between the second lens and the third lens.

6. The lens assembly as claimed in claim 3, wherein the lens assembly satisfies:

$3<f_2/f_3<4$;

wherein $f_2$ is an effective focal length of the second lens and $f_3$ is an effective focal length of the third lens.

7. The lens assembly as claimed in claim 3, wherein the first lens and the third lens are spherical lens, and the second lens, the fourth lens and the fifth lens are made of plastic material.

8. The lens assembly as claimed in claim 1, wherein the lens assembly satisfies:

$4.8<|f_4/f_3|<5.7$;

wherein $f_3$ is an effective focal length of the third lens and $f_4$ is an effective focal length of the fourth lens.

9. The lens assembly as claimed in claim 8, wherein the lens assembly satisfies:

$5.2<|f_5/f_3|<6.5$;

wherein $f_3$ is an effective focal length of the third lens and $f_5$ is an effective focal length of the fifth lens.

10. The lens assembly as claimed in claim 1, wherein the lens assembly satisfies:

$-3.5<R_{31}/R_{32}<-1.9$;

wherein $R_{31}$ is a radius of curvature of the object side surface of the third lens and $R_{32}$ is a radius of curvature of the image side surface of the third lens.

11. The lens assembly as claimed in claim 10, wherein the lens assembly satisfies:

$3.7<R_{31}/R_{12}<6.1$;

wherein $R_{12}$ is a radius of curvature of the image side surface of the first lens and $R_{31}$ is a radius of curvature of the object side surface of the third lens.

12. A lens assembly, comprising sequentially from an object side to an image side along an optical axis:
    a first lens with negative refractive power;
    a second lens with positive refractive power including a convex surface facing the object side and a concave surface facing the image side;
    a third lens with positive refractive power;
    a fourth lens with negative refractive power including a convex surface facing the object side and a concave surface facing the image side; and
    a fifth lens with negative refractive power including a convex surface facing the image side;
    wherein the lens assembly satisfies:

$-14.8<R_{52}/R_{42}<-10.7$;

wherein $R_{42}$ is a radius of curvature of the image side surface of the fourth lens and $R_{52}$ is a radius of curvature of the image side surface of the fifth lens.

13. The lens assembly as claimed in claim 12, wherein further comprising a stop disposed between the second lens and the third lens;
    the first lens comprises a convex surface facing the object side and a concave surface facing the image side; and
    the third lens comprises a convex surface facing the object side and another convex surface facing the image side.

14. The lens assembly as claimed in claim 13, wherein the first lens and the third lens are spherical lens, and the second lens, the fourth lens and the fifth lens are made of plastic material, the lens assembly satisfies:

$3<f_2/f_3<4$;

wherein $f_2$ is an effective focal length of the second lens and $f_3$ is an effective focal length of the third lens.

15. The lens assembly as claimed in claim 12, wherein the fifth lens further comprises a concave surface facing the object side.

16. The lens assembly as claimed in claim 12, wherein the lens assembly satisfies at least one of following conditions:

$4.8<|f_4/f_3|<5.7$;

$5.2<|f_5/f_3|<6.5$;

wherein $f_3$ is an effective focal length of the third lens, $f_4$ is an effective focal length of the fourth lens, and $f_5$ is an effective focal length of the fifth lens.

17. The lens assembly as claimed in claim 12, wherein the lens assembly satisfies at least one of following conditions:

$3.7<R_{31}/R_{12}<6.1$;

$-3.5<R_{31}/R_{32}<-1.9$;

wherein $R_{12}$ is a radius of curvature of the image side surface of the first lens, $R_{31}$ is a radius of curvature of the object side surface of the third lens, and $R_{32}$ is a radius of curvature of the image side surface of the third lens.

18. A lens assembly, comprising sequentially from an object side to an image side along an optical axis:
- a first lens with negative refractive power;
- a second lens with positive refractive power;
- a third lens with positive refractive power;
- a fourth lens with negative refractive power including a convex surface facing the object side and a concave surface facing the image side; and
- a fifth lens with negative refractive power including a convex surface facing the image side;

wherein the lens assembly satisfies:

$$4.8<|f_4/f_3|<5.7;$$

wherein $f_3$ is an effective focal length of the third lens and $f_4$ is an effective focal length of the fourth lens.

* * * * *